US 8,915,344 B2

(12) United States Patent
Schuller et al.

(10) Patent No.: US 8,915,344 B2
(45) Date of Patent: Dec. 23, 2014

(54) DUAL-CLUTCH TRANSMISSION

(75) Inventors: Dietmar Schuller, Altmannstein (DE);
Martin Bauer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 192 days.

(21) Appl. No.: 13/464,154

(22) Filed: May 4, 2012

(65) Prior Publication Data
US 2013/0118852 A1    May 16, 2013

(30) Foreign Application Priority Data
May 6, 2011 (DE) .......................... 10 2011 100 857

(51) Int. Cl.
*F16H 61/22* (2006.01)
*F16H 61/688* (2006.01)
*F16D 48/02* (2006.01)
*F16H 63/34* (2006.01)
*F16H 61/00* (2006.01)
*F16H 61/02* (2006.01)

(52) U.S. Cl.
CPC ............ *F16D 25/14* (2013.01); *F16H 61/0206* (2013.01); *F16D 2048/0281* (2013.01); *F16H 63/3483* (2013.01); *F16D 2048/0293* (2013.01); *F16H 61/0021* (2013.01); *F16D 48/0206* (2013.01); *F16H 61/688* (2013.01); *F16D 2048/0242* (2013.01); *F16D 2048/029* (2013.01)
USPC ....................... 192/3.58; 192/3.63; 192/219.4

(58) Field of Classification Search
CPC ................... F16H 63/3483; F16D 2048/0293
USPC ............................................ 192/219.4, 219.5
See application file for complete search history.

(56) References Cited

U.S. PATENT DOCUMENTS 5,240,093 A *  8/1993  Wagner et al. ............... 192/3.58
5,919,112 A     7/1999  Michael et al.
2003/0022754 A1 * 1/2003  Koga .............................. 477/71
2007/0170031 A1  7/2007  Kohlhaas et al.
2010/0099537 A1  4/2010  Maten et al.
2011/0077122 A1  3/2011  Lundberg et al.
2011/0314945 A1 * 12/2011 Brandenburg et al. .... 74/473.11

FOREIGN PATENT DOCUMENTS

| CN | 101900202 A | 12/2010 |
| CN | 102032339 A | 4/2011 |
| DE | 4117736 C1 | 5/1992 |
| DE | 196 25 019 A1 | 1/1998 |
| DE | 10 2004 033 362 A1 | 5/2007 |
| WO | WO 2010/083862 A1 * | 7/2010 |
| WO | WO2010083862 A1 | 7/2010 |

OTHER PUBLICATIONS

AUDI: Self-study program 457. In: AUDI. Ingolstadt: "AUDI A8'10 Power Transmission", Nov. 2009.—Company publication.

* cited by examiner

Primary Examiner — Richard M. Lorence
(74) Attorney, Agent, or Firm — Henry M. Feiereisen LLC

(57) ABSTRACT

A clutch transmission, in particular a dual-clutch transmission for a vehicle, such as a motor vehicle, includes at least one automatic transmission with a hydraulically actuatable clutch and at least one hydraulically actuatable gear actuator, and a hydraulic circuit having a tank supplying an unpressurized hydraulic medium and a pressure source supplying a pressurized hydraulic medium. For operating the respective clutch, a first pressure control valve and at least one second pressure control valve are arranged upstream of the respective coupling. At least one of the pressure control valves is connected with an upstream switching device which connects the at least one pressure control valve and a hydraulically actuatable parking lock either with the pressure source or with the tank.

13 Claims, 6 Drawing Sheets

DUAL-CLUTCH TRANSMISSION

CROSS-REFERENCES TO RELATED APPLICATIONS

This application claims the priority of German Patent Application Serial No. 10 2011 100 857.1, filed May 6, 2011, pursuant to 35 U.S.C. 119(a)-(d), the content of which is incorporated herein by reference in its entirety as if fully set forth herein.

BACKGROUND OF THE INVENTION

The present invention relates to a clutch transmission, in particular a dual-clutch transmission for a vehicle, in particular a motor vehicle.

The following discussion of related art is provided to assist the reader in understanding the advantages of the invention, and is not to be construed as an admission that this related art is prior art to this invention.

Dual-clutch transmissions are preferably used in passenger automobiles. A dual-clutch transmission usually includes two coaxially arranged gear input shafts which are each associated with a respective transmission, to be referred here also as subsidiary transmissions. A corresponding clutch is associated with each of the gear input shafts, which can be used to frictionally couple via the gear input shafts of the respective transmission the gear input shaft with the output of a motor, preferably a combustion engine of a motor vehicle. A first of the two transmissions typically includes the odd gears, whereas a second of the subsidiary transmissions includes the even gears and the reverse gear. Simple clutch transmissions typically include only a single clutch and only a single transmission which can be used to switch all gears of the clutch transmission.

Typically, one of the transmissions is active when driving, meaning that the gear input shaft associated with this transmission is coupled with the motor via the associated clutch. A gear is engaged in the active transmission which provides a current gear ratio. A controller determines if the next higher or next lower gear is to be engaged depending on the driving situation. This gear which may be used as the next gear is then engaged in the second inactive transmission. To change gears, the clutch of the inactive transmission is engaged, whereas the clutch of the active transmission is disengaged. Preferably, disengaging the clutch of the active gear and engaging the clutch of the inactive gear overlap each other such that the force flow from the motor to the drive shaft of the motor vehicle is not interrupted at all or is only slightly interrupted. Subsequent to the gear change, the previously active transmission becomes inactive, whereas the previously inactive transmission becomes the active transmission. Thereafter, the next potentially required gear can now be engaged in the now inactive subsidiary transmission.

The gears are engaged and disengaged by way of elements, preferably by way of selector rails, which are operated by hydraulic cylinders, the so-called switching cylinders already mentioned above. The hydraulic cylinders are preferably constructed as double-acting hydraulic cylinders, in particular synchronous cylinders or differential cylinders, so that two gears can preferably be associated with each switching cylinder. Alternatively, single-acting hydraulic cylinders may also be provided. The hydraulic cylinders operating the elements, in particular the selector rails, are also referred to as gear selector cylinders. A gear selector cylinder constructed as a synchronous cylinder having two associated gears has preferably three switching positions, wherein a predetermined gear is engaged in a first switching position, another predetermined gear in a second switching position, and none of the two aforementioned gears in a third switching position.

The clutches associated with the two transmissions are also hydraulically operated, meaning engaged or disengaged. Preferably, the clutch is engaged when hydraulic pressure is applied, whereas the clutch is disengaged when hydraulic pressure is not applied, i.e., pressure is relieved from a hydraulic cylinder—previously also referred to as coupling cylinder—associated with the respective clutch.

As already mentioned, clutch transmissions are controlled or regulated as well as cooled by a hydraulic circuit. The operation of a dual-clutch transmission is also known in the art and will therefore not be described here in greater detail.

In addition, vehicle transmissions are known with a so-called parking lock which locks the transmission when suitably actuated and thus particularly blocks the driven wheels of the vehicle. The parking lock can typically be operated with an electric motor or hydraulically.

It would therefore be desirable and advantageous to obviate prior art shortcomings and to provide an improved dual-clutch transmission with increased efficiency and functionality of the hydraulic circuit, which is inexpensive to manufacture and has a small number of individual components.

SUMMARY OF THE INVENTION

According to one aspect of the present invention, a clutch transmission with at least one automatic transmission includes a hydraulically actuatable clutch, at least one hydraulically actuatable gear actuator, a hydraulic circuit with a tank supplying an unpressurized hydraulic medium and a pressure source supplying a pressurized hydraulic medium, a first pressure control valve and at least one second pressure control valve arranged upstream of the clutch for operating the clutch, a hydraulically actuatable parking lock, and an upstream switching device connecting at least one of the pressure control valves and the hydraulically actuatable parking lock either with the pressure source or with the tank.

With the clutch transmission according to the invention, at least one secondary circuit of the hydraulic circuit and/or at least one partial function of the clutch transmission or the dual-clutch transmission is advantageously also switched when the parking lock is actuated.

This has the significant advantage that at least a partial function of the dual-clutch transmission is automatically deactivated when the parking lock is engaged, resulting in potential energy savings, while at the same time increasing the safety of the clutch transmission. At least one of the pressure control valves arranged upstream of the clutches and/or of the gear selectors is connected downstream of the switching device, wherein the switching device is also connected with the parking lock.

According to an advantageous feature of the present invention, the parking lock and the corresponding pressure control valve may be connected to the same connection of the switching device or may have a common supply line arranged downstream of the switching device. The parking lock is released or disengaged by applying pressure from the hydraulic medium. In this way, the at least one pressure control valve is also switched unpressurized and the function thus set is deactivated when the parking lock is engaged. For example, when the pressure control valve is arranged upstream of the gear selectors, the hydraulic medium is no longer supplied to the switching mechanism of the transmission when the parking lock is engaged, so that a gear can no longer be set with the gear selector. However, this is also not necessary or even useful when the parking lock is engaged. As a result, energy can be saved by actuating the parking lock because the hydraulic medium needs no longer be supplied to the gear selectors, so that the capacity of the pressure source, in particular of a pump pressurizing the hydraulic medium, can be reduced.

According to an advantageous feature of the present invention, the first pressure control valves and/or the second pressure control valves may be connected with the switching device. As already mentioned, the gear selector device may be deactivated by connecting the second pressure control valve with the switching device when the parking lock is engaged. Advantageously, the first pressure control valves or at least one of the first pressure control valves may be alternatingly connected with the switching device, so that one or both clutches are switched unpressurized when the parking lock is engaged. According to another advantageous feature of the present invention, the first pressure control valves and the at least one second pressure control valve may be connected with the switching device, causing the entire hydraulic system of the transmission used for transmitting the drive torque to be deactivated. When the hydraulic circuit also includes a secondary circuit used for cooling the dual-clutch transmission, then this secondary circuit may continue to operate, wherein a reduced power is then required for cooling and also for conveying the hydraulic medium.

According to an advantageous feature of the present invention, the switching device may have at least one first switching valve which is connected with the pressure control valve at a first connection, at a second connection with the pressure source and at a third connection with the tank. The switching valve may advantageously be constructed as a 3/2-way switching valve which can assume two extreme positions or extreme states. Advantageously, the switching valve connects in a first extreme state the parking lock and the corresponding pressure control valve with the tank, so that both can be switched unpressurized, and connects in a second extreme state the parking lock and the corresponding pressure control valve with the pressure source, so that the parking lock is disengaged and pressurized hydraulic medium is supplied to the pressure control valve.

According to an advantageous feature of the present invention, the first connection of the first switching valve may additionally be connected with the parking lock. The first connection may here have two outputs or may run into a common supply line extending both to the parking lock and to the corresponding pressure controller.

Alternatively, the switching device may have a second switching valve which is connected with the pressure source, the tank and the parking lock, wherein the second switching valve is associated with the first switching valve and operates as a pilot valve. According to this embodiment, the switching device may include two switching valves, with one switching valve connected directly between the pressure source and the pressure control valve and the other, second switching valve operating as a pilot valve. The second switching valve is thus provided only for operating the parking lock. By arranging the second switching valve upstream of the first switching valve as a pilot valve, the first switching valve, which is in turn connected with the corresponding pressure control valve, is also operated when the second switching valve is operated, so that by operating the second switching valve, for example for disengaging the parking lock, the first switching valve is switched simultaneously for supplying hydraulic medium to the corresponding pressure control valve. An electric actuator for controlling the first switching valves can hence be eliminated. In addition, both valves, i.e. the switching valve and the pressure control valve, can be optimized for their respective purpose. Advantageously, the second switching valve may also be constructed as a 3/2-way valve. It would also be feasible to construct one of the switching valves as a proportional valve.

According to an advantageous feature of the present invention, at least the switching valve connected with the parking lock, i.e. the first switching valve or the second switching valve, depending which of the two switching valves is connected with the parking clock, may include a return spring which urges the switching valve into its first extreme state, in which the parking lock is connected with the tank for unpressurized switching. The return spring is thus used to move the switching valve to a safety position, in which the parking lock cannot be disengaged or engaged, for example, if an operating current fails. Advantageously, the parking lock may have a hydraulic actuator connected with the corresponding switching valve as well as an electromagnetically actuatable locking mechanism which holds the parking lock in its disengaged state, preferably with an interlock. If the parking lock is actually engaged in the absence of hydraulic pressure depends if the locking mechanism releases the parking lock, wherein the parking lock is advantageously urged into the engaged position against a return pressure which is preferably generated by a mechanical spring element.

According to another advantageous feature of the present invention, the at least one second pressure control valve may be connected directly with the pressure source. Accordingly, hydraulic medium continues to be supplied to the gear selector independent of the actuation of the parking lock, because the second pressure control valve is connected directly with the pressure source. For this purpose, the second pressure control valve is, for example, connected with the connection of the switching valve to which the pressure source is also connected. Alternatively, a line leading to the switching valve or the switching device can branch off from a corresponding pressurized line of the pressure source, as well as another pressurized line leading to the second pressure control valve.

According to an advantageous feature of the present invention, the pressure source may be in form of at least one pump which can advantageously be driven by an electric motor, so that the pump capacity is independent of the rotation speed of a combustion engine that can be operatively connected to the clutch transmission. When both first pressure control valves associated with the clutches are connected with the switching device or the switching valve, at least the clutches are switched unpressurized when the parking lock is actuated, thereby preventing force transmission from the combustion engine to the transmission, while still allowing gear actuation processes to be carried out in the transmission.

According to another advantageous feature of the present invention, at least the (first or second) switching valve connected with the parking lock may have, in addition or alternatively to the return spring, at least one valve face which is connected with the pressure source for pressure regulation. The corresponding switching valve is hereby constructed such that, when the pressure of the pressure source exceeds a predetermined value, the switching valve moves into its extreme state in which the parking lock is connected with the tank. For example, the parking lock can hereby be protected from exceedingly high pressures.

According to yet another advantageous feature of the present invention, the pressure source may include at least one pump which can be/is driven by an electric motor and/or at least one hydraulic pressure accumulator. The pressure source, in particular the pump and/or the pressure accumulator, may advantageously be connected by way of a supply line or pressure line, as described above, with the switching device and in particular with the first and/or the second switching valve of the switching device.

According to another advantageous feature of the present invention, at least the switching valve connected with the parking lock may connect the pressure source, in particular the pressure accumulator, with the tank, even when the parking lock is connected with the tank. In this way, the pressure accumulator is emptied when the parking lock is engaged, thereby preventing the parking lock from unintentionally disengaging.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
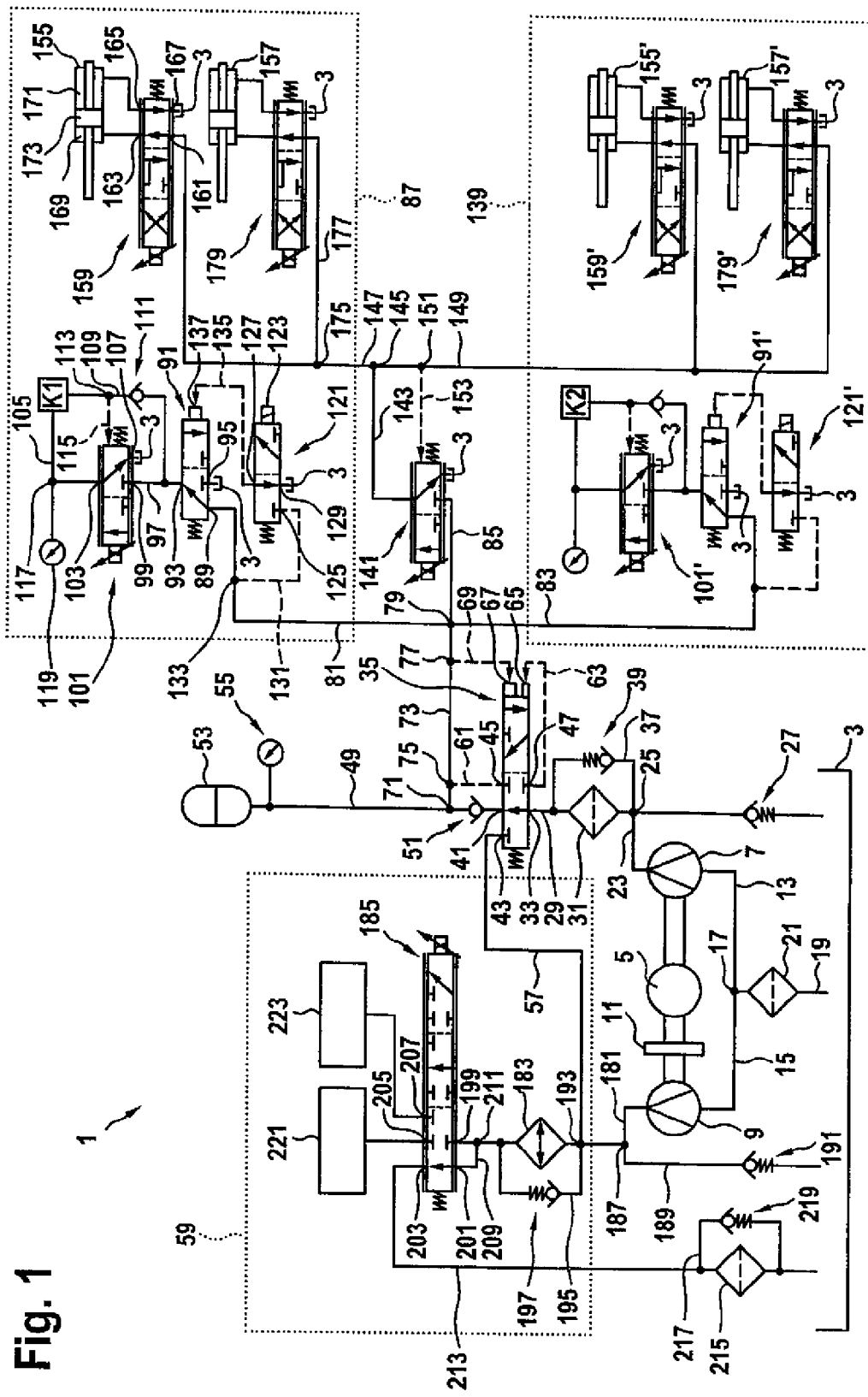
FIG. 1 shows a schematic diagram of a hydraulic circuit.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a hydraulic circuit 1 for actuating, in particular operating, a clutch and for engaging and disengaging gears of a dual-clutch transmission as well as for cooling a dual-clutch transmission. The hydraulic circuit 1 includes a tank 3 used, in particular, as reservoir or sump for a hydraulic medium used for operating or cooling, in which the hydraulic medium is preferably stored unpressurized. An electric motor 5 is provided which drives a first pump 7 and a second pump 9. Preferably, the rotation speed and the rotation direction of the electric motor 5 can be controlled, preferably regulated. The first pump 7 is fixedly connected with the electric motor 5, i.e., without a separation element. The pump 7 is hence always a driven when the electric motor 5 is running and the hydraulic medium is preferably conveyed in the same direction in both rotation directions. The pump 9 is preferably connected with the electric motor 5 by a separation element 11. The pump 9 can thus be decoupled from the electric motor 5 so that the pump 9 does not run when the electric motor 5 runs. The separation element 11 is preferably constructed as a clutch or a freewheel, wherein in the second case the rotation direction of the electric motor 5 determines if hydraulic medium is conveyed by the pump 9 or not.

The first pump 7 and the second pump 9 are each connected via a corresponding line 13, 15 with a branch 17 into which another line 19 runs. The line 19 connects the tank 3 with the branch 17 via a suction filter 21. Overall, the inlets of the pumps 7, 9 are connected with the tank 3 via the lines 13, 15, the branch 17 and the line 19 having the suction filter 21.

The outlet of the first pump 7 is connected with a line 23 leading to a branch 25. The branch 25 is connected via a pressure limiting valve 27 with the tank 3. The pressure limiting valve 27 is configured to open toward the tank 3 under overpressure. In addition, a line 29 which runs via a pressure filter 31 to a connection 33 of a switching valve 35 originates from the branch 25.

The pressure filter 31 can be bridged by a bypass 37, wherein a difference pressure valve 39 which allows bridging the filter 31 in the direction of the connection 33 under overpressure is arranged in the bypass 37. The difference pressure valve 39 opens above a predetermined difference pressure across the pressure filter 31.

The switching valve 35 is constructed as a 5/2-way valve, which has four additional connections 41, 43, 45, 47 in addition to the connection 33. In a first switching state of the switching valve 35 illustrated in FIG. 1, the connection 33 is connected with the connection 41, whereas the additional connections 43, 45 and 47 are switched blind, i.e. closed. The connection 41 terminates in a line 49 in which a check valves 51 is arranged. The line 49 runs to a pressure accumulator 53, wherein a pressure measuring device 55 is hydraulically connected with the line 49 upstream of the pressure accumulator 53.

In a second switching state of the switching valves 35 illustrated in FIG. 1, the connection 33 is connected with a connection 43 which runs into a line 57 leading to a secondary hydraulic circuit 59 used particularly for cooling clutches of the dual-clutch transmission. In this second switching state, the connection 41 is switched blind and the connection 45 is connected with the connection 47. The connection 45 runs into a line 61 having the pressure of the hydraulic medium in the pressure accumulator 53. The connection 47 runs into a line 63 which is hydraulically connected with a first valve face 65 of the switching valve 35. Pressure of the pressure accumulator 53 is permanently applied to a second valve face 67 of the switching valve 35 via a line 69.

A line 73 branches off from the line 49 at a branch 71, with the line 61 branching off from the line 73 at a branch 75 and the line 69 at a branch 77. The branch 71 is connected to the check valve 51 on a side of the check valve 51 facing away from the switching valve 35.

The line 73 runs into a branch 79 from which the lines 81, 83 and 85 originate.

The line 81 runs to a secondary transmission circuit 87 for supplying a first secondary transmission. The first secondary transmission has a clutch K1. The line 81 runs into a connection 89 of a switching valve 91 constructed as a 3/2-way valve and operating as a safety valve for the clutch K1. In a first illustrated switching state of the switching valve 91, the connection 89 is hydraulically connected with the connection 93, whereas the connection 95 of the switching valve 91 is switched blind. In a second switching state of the switching valve 91 illustrated in FIG. 1, the connection 93 is connected with the connection 95 and via the connection 95 with the tank 3, whereas the connection 89 is switched blind. As will become clear in the following description, the clutch K1 is switched unpressurized in this second switching state.

The connection 93 is connected with a line 97 and via this line with a connection 99 of a pressure control valve 101. The pressure control valve 101 is constructed as a 3/2-way proportional valve with a connection 103 that is connected via a line 105 with the clutch K1. The pressure control valve 101 also has a connection 107 connected with the tank 3. In a first extreme state of the pressure control valve 101, the connection 99 is connected with the connection 103, whereas the connection 107 is switched blind. In this case, the full pressure of the hydraulic medium in the line 97 acts on the clutch K1. In a second extreme state, the connection 103 is connected with the connection 107, so that the clutch K1 is unpressurized. The pressure control valve 101 regulates the pressure in the clutch K1 in a conventional manner through proportional variation between these extreme states. A line 109 runs from the clutch K1 via a check valve 111 back to the line 97. When the pressure in the clutch K1 exceeds the pressure in the line 97, the check valve 111 opens, opening a hydraulic connection between the clutch K1 and the line 97 via the line 109. A line 115, which returns the pressure in the clutch K1 as a control valuable to the pressure control valve 101, branches off from the line 109 at a branch 113.

A branch 117 with an operatively connected hydraulic pressure measurement device 119 is disposed in the line 105. In this way, the pressure in the clutch K1 is measured by the pressure measurement device 119.

The switching valve 91 is controlled by a pilot valve 121 which is constructed as a 3/2-way valve and actuated by an electric actuator 123 and which includes the connections 125, 127 and 129. The connection 125 is connected via a line 131 with a branch 133 disposed in the line 81. The connection 127 is connected via a line 135 with a valve face 137 of the switching valve 91. In a first illustrated switching state of the pilot valve 121, the connection 125 is switched blind, whereas the connection 127 is connected with the connection 129 and via the connection 129 with the tank 3, whereby the valve face 137 of the switching valve 91 is switched unpressurized via the line 135. Preferably, the pilot valve 121 assumes this switching state when no electric control signal is applied to the actuator 123. In a second switching state that can be assumed by the pilot valve 121, the connection 125 is connected with the connection 127, whereas the connection 129 is switched blind. In this case, the pressure in the line 81 acts via the branch 133, the line 131 and the line 135 on the valve face 137 of the switching valve 91, whereby the switching valve 91 is switched against a bias force into its second switching state in which the connection 33 is hydraulically connected with the connection 95, so that the clutch K1 is switched unpressurized. Preferably, the switching valve 91 can be operated by controlling the pilot valve 121 electrically such that the clutch K1 is switched unpressurized and hence disengaged.

The line 83 originating from the branch 79 supplies a clutch K2 of a secondary hydraulic circuit 139 of the second secondary transmission. Control of the clutch K2 also includes a switching valve 91', a pilot valve 121' and a pressure control valve 101'. The operation is identical to the operation already described in connection with the first clutch K1. Reference is hereby made to the description of the secondary transmission circuit 87. The hydraulic controls the clutch K2 corresponds to those of the clutch K1.

The line 85 originating from the branch 79 is connected with a pressure control valve 141 configured for regulating the pressure of the hydraulic medium in a line 143. Preferably, the operation of the pressure control valve 141 corresponds to the operation of the pressure control valves 101, 101', making a further description unnecessary. The line 143 is connected with a branch 145 from which a line 147 and a line 149 originate. A branch 151 from which a line 153 originates is provided in the line 149, wherein the pressure in the line 149 and hence in the line 143 is returned via the line 153 to the pressure control valve 141 as a control variable. It will be understood that the branch 151 can also be located in the lines 151 or 147.

The line 147 is used for supplying gear selectors 155 and 157 in the secondary gear circuit 87 which are constructed as double-acting cylinders, meaning synchronous cylinders.

A volume control valve 159 constructed as a 4/3-way proportional valve is provided for hydraulic control of the gear selector 155. It has four connections 161, 163, 165 and 167. The first connection 161 is connected with the line 147, the second connection 163 is connected with a first chamber 169 of the gear selector 155, the third connection 165 is connected with a second chamber 171 of the gear selector 155, and the fourth connection 167 is connected with the tank 3. In a first extreme state of the volume control valve 159, the first connection 161 is connected with the second connection 163, whereas the third connection 165 is connected with the fourth connection 167. The hydraulic medium can then flow from the line 147 into the first chamber 169 of the gear selector 155, whereas the second chamber 171 is switched unpressurized via the connections 165, 167 to the tank 3. In this way, a piston 173 of the gear selector 155 is moved in a first direction for disengaging, for example, a predetermined gear of the dual-clutch transmission, or for engaging another predetermined gear.

In a second extreme state of the volume control valve 159, both the connection 163 and the connection 165 are connected with a connection 167, whereby the connection 161 is switched blind. In this way, both chambers 169, 171 of the gear selector 155 are connected with the tank 3 and thus switched unpressurized. The piston 173 of the gear selector 155 then remains in its current position, because no forces are applied to the piston 173.

In a third extreme state of the volume control valve 159, the connection 161 is connected with a connection 165, and the connection 163 is connected with the connection 167. The hydraulic medium then flows from the line 147 into the second chamber 171 of the gear selector 155, and the first chamber is switched unpressurized via the connection 163 and the connection 167 to the tank 3. The hydraulic medium then exerts a force on the piston 173 of the gear selector 155 such that the gear selector 155 is moved in a second direction opposite the first direction. In this way, the aforementioned predetermined other gear can be disengaged and the aforementioned predetermined gear can be engaged.

As described above, the volume control valve 159 is constructed as a proportional valve. The flow of the hydraulic medium coming from the line 147 is divided among the chambers 169, 171 by varying the valve states between the three extreme states, making it possible to set a predetermined speed for engagement and/or disengagement of a gear by controlling/regulating the volume flow.

A line 177 which runs into a volume control valve 179 used for controlling the gear selector 157 branches off from the line 147 at a branch 175. The operation of the hydraulic control of the gear selector cylinder 157 is identical to that described in conjunction with the gear selector 155, obviating the need for another description.

The line 149 is used for supplying gear selectors 155' and 157' of the second secondary transmission in the secondary transmission circuit 139. The gear selectors 155' and 157' are also controlled by volume control valves 159' and 179'. The secondary transmission circuit 87 and 139 are constructed identically with respect to the control of the gear selector 155, 155' and 157, 157', respectively. Reference is here made to the prior description.

The outlet of the pump 9 is connected with a line 181 running to the hydraulic secondary circuit 59 which is preferably used for cooling the couplings K1, K2. The line 181 runs via a cooler 183 to a volume control valve 185. A branch 187 is arranged in the line 181 downstream of the outlet of the pump 9 and upstream of the cooler 183, with a line 189 which runs to the tank 3 via a pressure limiting valve 191 opening in the direction of the tank 3 branching off from the branch 187. A branch 193 in which the line 57 runs is provided downstream of the branch 187 and upstream of the cooler 183; the line 57 originates from the switching valve 35 and is connected with the connection 43 of the switching valve 35. The hydraulic medium conveyed by the pump 7 can be supplied to the secondary hydraulic circuit 59 via the line 57, when the switching valve 35 is in its second switching state. In addition, a bypass 195 which has a difference pressure valve 197 and is arranged in parallel with the cooler 183 branches off from the branch 193. The difference pressure valve 197 opens the bypass in the direction of the volume control valve 185 under overpressure. The cooler 183 can be bridged in this manner.

The volume control valve 185 is constructed as a 4/3-way proportional valve having connections 199, 201, 203, 205 and 207. The connection 199 is connected with the line 181 via the cooler 183 or the difference pressure valve 197, like the connection 201 which is connected via a line 209 and a branch 211 with the line 181. The connections 199 and 201 therefore form a common connection of the volume control valve 185, because both are connected with the line 181 downstream of the cooler 183. Two connections 199, 201 are shown only for sake of clarity, although only a single connection, for example 199 or 201, for the line 181 are provided on the volume control valve 185; according to an alternative embodiment, the volume control valve 185 can actually be constructed with two separate connections 199, 201 as a 5/3-way proportional valve. For a better understanding, the following discussion relates to the illustrated embodiment; however, it should be noted that the connections 199 and 201 are actually only a single connection which is switched accordingly. The connection 203 is connected with a line 213 running via a pressure filter 215 to the tank 3. The pressure filter 215 can be bridged by a bypass 217 having a difference pressure valve 219 that opens toward the tank 3.

The connection 205 of the volume control valve 185 is connected with a cooling system 221 particularly for the first coupling K1. The connection 207 is connected with a second cooling system 223 particularly for the second coupling K2.

In a first extreme state of the volume control valve 185 illustrated in FIG. 1, the connection 201 is connected with the connection 203, whereas the connections 199, 205 and 207 are switched blind. The entire flow of the hydraulic medium flowing into the hydraulic line 181 and through the cooler 183, respectively, is hence conveyed via the connections 201, 203 into the line 213 and thus via the pressure filter 215 into the tank 3.

In a second extreme state, the connections 199 and 205 are connected with each other, whereas the connections 201, 203 and 207 are switched blind. In this state, the entire flow of the hydraulic medium arriving at the volume control valve 185 is supplied to the first cooling system 221.

In a third extreme state of the volume control valve 185, the connections 199 and 207 are connected with each other. The connections 201, 203 and 205 are switched blind. In this state, the entire flow of the hydraulic medium in the line 185 is conveyed to the second cooling system 223.

As already described, the volume control valve 185 is constructed as a proportional valve, allowing intermediate states between the aforedescribed extreme states to be set, allowing the volume flow to the cooling systems 221, 223 and to the pressure filter 215, respectively, to be regulated. Alternatively, the volume control valve 185 can also be cycled, whereby at least one of the three extreme states is assumed for a brief time. The time average of the volume flow, which is supplied to the cooling systems 221, 223 and the pressure filter 250, respectively, and hence to the tank 3, is likewise controlled or regulated in this operating mode.

FIG. 1 shows that, in addition to the flow of the hydraulic medium actually present in the line 181, a flow of the hydraulic medium can flow through the line 57 and be conveyed to the secondary hydraulic circuit 59. Alternatively, only the line 57 may supply the hydraulic medium. It should be mentioned that each of the proportional valves 101, 101', 141, 159, 159', 179, 179', 185 is each electrically adjustable, a particularly against the spring force.

As already discussed above, the line 57 runs into the secondary hydraulic circuit 59, or more precisely into the line 181 downstream of the pump 9. According to an alternative unillustrated embodiment, the line 57 runs into the line 181 preferably downstream of the cooler 183. According to the alternative embodiment, the total volume flow through the cooler 183 is reduced by supplying the hydraulic medium from the high-pressure circuit into the secondary hydraulic circuit 59. The pressure drop across the cooler 183 is reduced as a result of the reduced volume flow, which also reduces the required drive energy for the pumps 7 and/or 9. The drive energy for the electric motor 5 is also reduced by reducing the back pressures. According to another embodiment, with a sufficiently large reduction of the back pressures or of the pressure level—independent of how this reduction is achieved —, the pump 9 can be connected directly with electric motor 5, i.e. the illustrated separation clutch 11 can be eliminated.

According to another unillustrated embodiment relating to the arrangement of the pressure filter 215, the pressure filter is not arranged in the line 213 between the volume control valve 185 and tank 3, but instead preferably in the line 181, in particular between the cooler 183 and the volume control valve 185. Preferably, the line 57 runs into the line 181 downstream of the pressure filter 215. With the alternative arrangement of the pressure filter 215 which is now located in the main flow of the hydraulic medium, the time during which the hydraulic medium is filtered by the pressure filter 215 is increased. The bypass valve 219 is hereby preferably designed for a minimum back pressure across the volume flow.

According to another embodiment, as an alternative embodiment to the illustrated and described embodiment of the volume control valve 185, the switching positions may preferably be interchanged so that in the first extreme state the connections 199 and/or 201 are connected with the connection 205 or 207, whereas the other connections of the volume control valve 185 are switched blind; in the second extreme state, the connections 201 and/or 199 are connected with the connection 203, whereas the other connections are switched blind; and in the third extreme state the connections 199 and/or 201 are connected with the connection 207 or 205, whereas the other connections are switched blind. By interchanging the switching position, during a cycled control of the volume control valve 185 for controlling a desired flow of the hydraulic medium for one of the clutches K1 or K2 a volume flow is prevented from also flowing to the other coupling K2 and K1, respectively. Instead, the cycled volume flow that is not conveyed to the respective coupling K1 or K2 is conveyed into the tank 3. In the actual configuration of the volume control valve 185 as a 4/3-way proportional valve, the connections 199 and 201 are always to be understood as a common or sole connection of the line 181 to the volume control valve 185, meaning that only one of the two connections 199, 201 is provided on the volume control valve 185.

Figure 2:
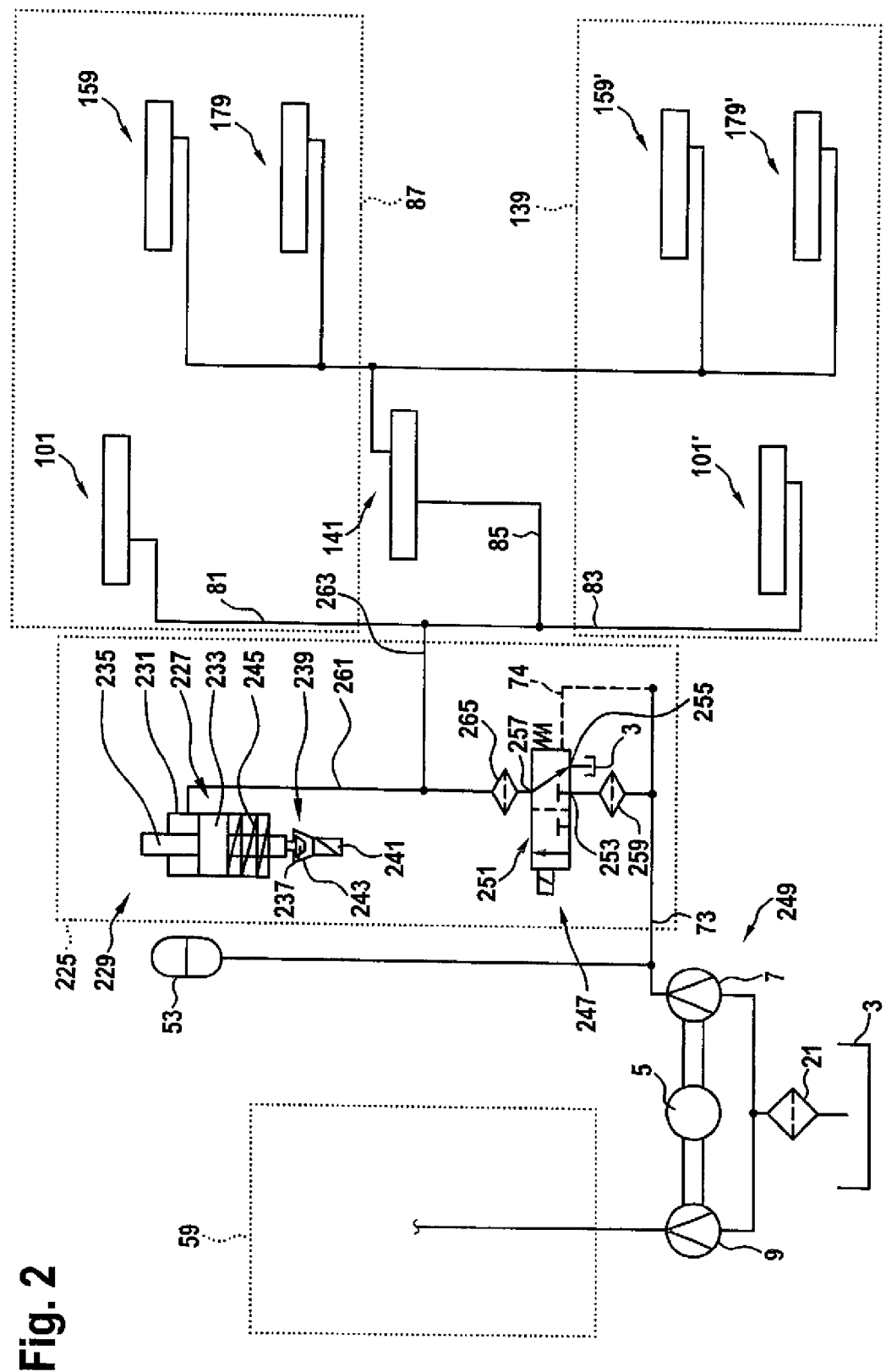
FIG. 2 shows an advantageous modified embodiment of the hydraulic circuit.
Figure 3:
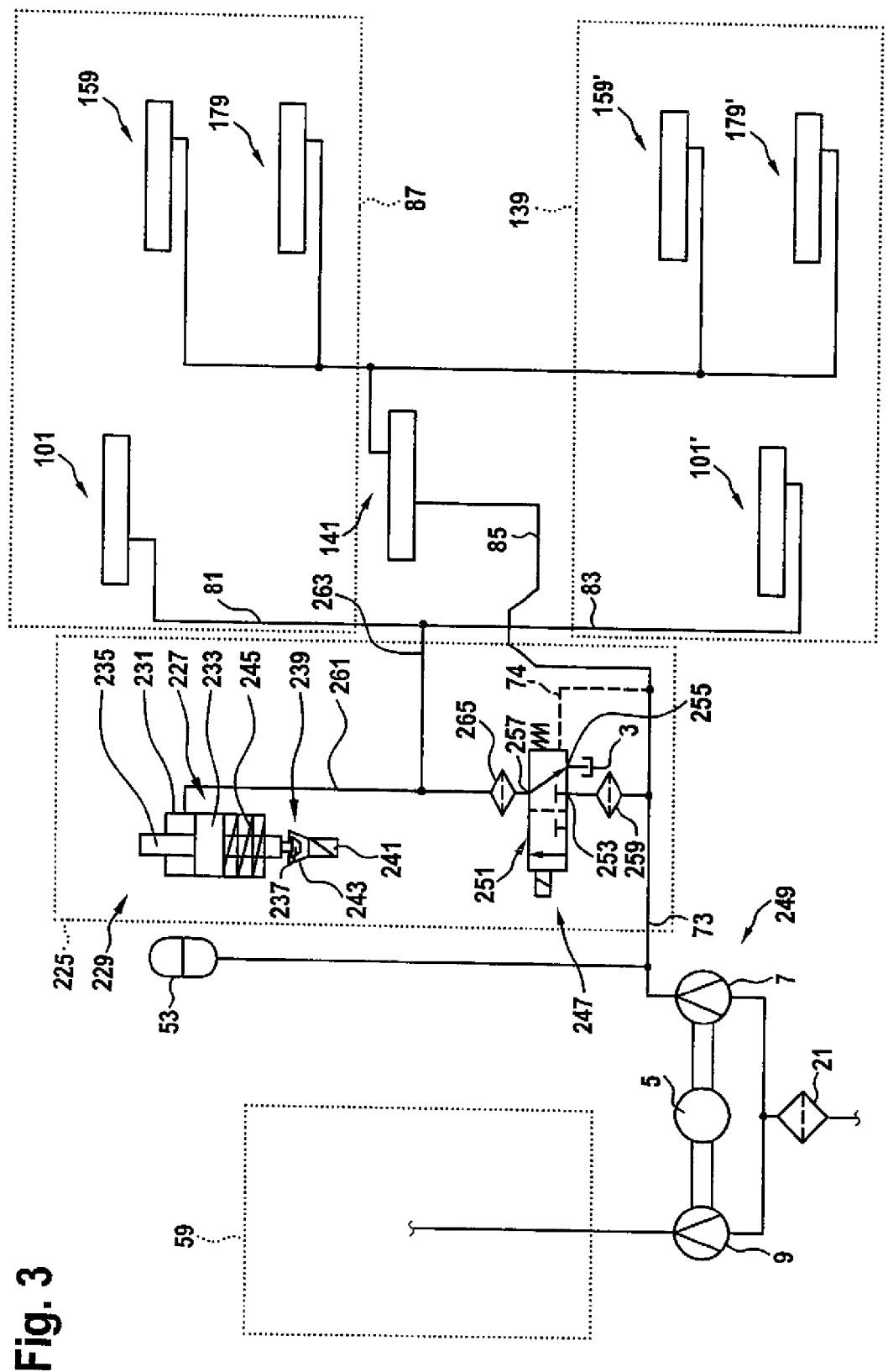
FIG. 3 shows an advantageous variant of the modified hydraulic circuit.

FIGS. 2 and 3 show a schematic diagram of sections of the hydraulic circuit 1 according to a preferred modified embodiment. In the following figures, elements already described in relation to FIG. 1 have identical reference symbols, so that reference is made here to the foregoing description.

An important difference to the preceding embodiment is that the hydraulic circuit 1 now has a secondary hydraulic circuit 225 which is used essentially for actuating a parking lock 227. The parking lock 227 includes a hydraulically actuatable actuator 229 with a piston 233 which is axially movable in a cylinder 231, wherein one end of the piston 233 forms a parking lock element 235 which can be engaged in the transmission for engaging the parking lock, and the other end forms a retaining element 237 which is associated with a retaining device 239. The retaining device 239 has an electromagnet 241 acting on a locking mechanism 243. The locking mechanism engages in an undercut of the retaining element 237 to hold the piston 233 against the pressing force of a return spring 245 in the extended or unlocked position. By actuating the electromagnet 241, the locking mechanism 243, which in the present example is preferably constructed as a pair of gripper arms, is closed, whereby due to the generated magnetic force the gripper arm pair move or pivot towards each other in order to engage behind the undercut of the retaining element 237. When current flow to the electromagnet 241 is disconnected, the gripper arm pair opens, thereby releasing the retaining element 237 and urging or moving the piston 233 with the return spring 245 in the direction of the retaining element 235 and locking the transmission. Alternatively, the retaining device 239 may be constructed so that the gripper arm pair opens upon actuation, i.e. by applying current to the electromagnet 241, whereas the gripper arm pair remains in its position in the undercut when current does not flow through the electromagnet 241. A hydraulic chamber, which is connected via a switching device 247 with the pressure source 249 composed of the pressure accumulator 53 and at least the pump 7, is formed on the side facing the return spring 245.

In the present exemplary embodiment, the switching device 247 is connected in the line 73. The switching device 247 has a first switching valve 251 constructed as a 3/2-way switching valve. The first switching valve 251 has a first connection 253, a second connection 255 and a third connection 257. The first connection 253 is here connected via a pressure filter 259 with the pressure line 73. The connection 255 is connected with the tank 3 and the connection 257 is connected with a line 261 running to the actuator 229 or its pressure chamber, respectively. A line 263 running into the line 83 branches off from the line 261, with the lines 81 and 85 branching of the line 83. Before branching off into the line 263, an additional pressure filter toward 65 is provided in the line 261 upstream of the switching valve 251. The line 263 forms an extension of the line 73 of FIG. 1.

The switching valve 251 can be actuated electrically, in particular electromagnetically, and is electrically movable against the pressure in the line 73 against the force of a return spring and optionally, additionally or alternatively, with a pressure line 74 which branches off from the line 79. Alternatively, the switching valve 251 may also be operated pneumatically or hydraulically. In the first illustrated extreme position, or in the first extreme state, the switching valve 251 connects the connection 257 with a connection 255, as well as the actuator 229 with the tank 3, so that the actuator 229 is switched unpressurized. In this state, the piston 233 could be moved into its locking position if the electromagnet 241 had to be operated for opening the locking mechanism 237.

In its second extreme state, the switching valve 251 connects the connection 253 with a connection 257, so that hydraulic medium coming from the pressure source 249 is conveyed to the actuator 229 and the pressure control valves 101, 141 and 101'. When the switching valve 251 is actuated, pressure builds up on the side of the piston 233 facing the return spring 245, which moves the piston 233 in the direction of the retaining device 239. The previously engaged parking lock 227 is then released or disengaged. By constructing the end of the piston 233 forming the retaining element 237 as a truncated cone, this end moves between the gripper arms of the locking mechanism 243 which preferably reaches the undercut position by applying current to the electromagnet 241, thereby holding the piston 233 with an interlock in the extended position even when the pressure is no longer present in the pressure chamber.

Because at the same time the pressure control valves 101, 101' and 141 are connected with the pressure source 249, the dual-clutch transmission can now be switched and the clutch operated. For engaging the parking lock 227, the switching valve 251 is moved into its first extreme state, so that the pressure control valves 101, 101' and 141 and the actuator 229 are switched unpressurized. If the retaining device 239 is also actuated accordingly, the parking lock is engaged and the transmission locked, preventing operating the clutch and shifting gears.

FIG. 3 shows an advantageous modified embodiment of the embodiment illustrated in FIG. 2, wherein the pressure control valve 141 arranged upstream of the pressure control valves 159, 171 and 159', 179' is directly connected by the line 85 with the line 73 and hence directly with the pressure source 249. In all other aspects, this embodiment corresponds to the aforedescribed embodiment. In this way, when the parking lock 227 is hydraulically switched unpressurized, as illustrated in FIG. 3, the pressure control valve 141 arranged upstream of the gear selectors 155, 155', 157, 157' remains connected with the pressure source 249, allowing switching but not engaging one of the clutches K1 and K2. According to the present exemplary embodiment, only a partial function or a secondary hydraulic circuit, namely the secondary hydraulic circuit relating to the couplings K1, K2, is deactivated when the parking lock can be disengaged or is disengaged, and/or when the switching valve 251 is moved into its first extreme state.

Figure 4:
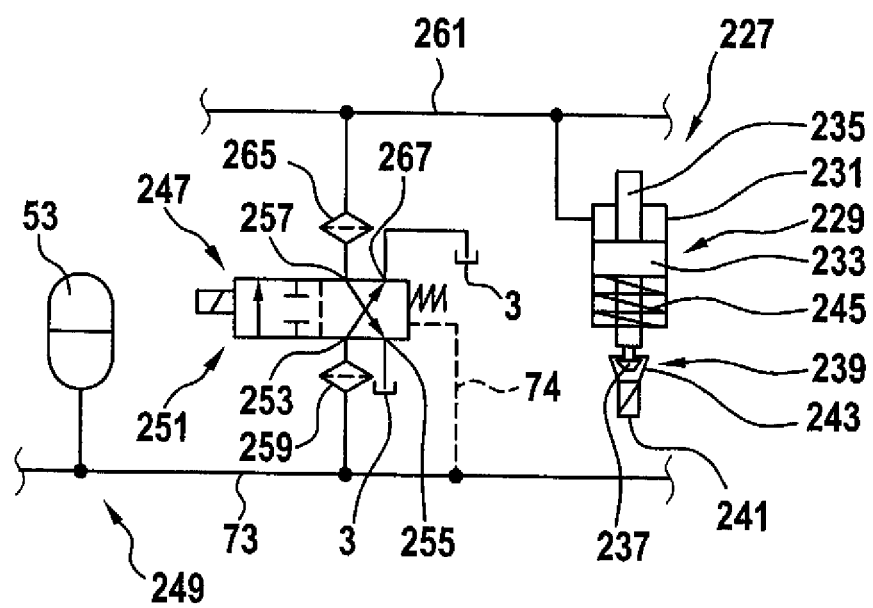
FIG. 4 shows a switching device of the hydraulic circuit for actuating the parking brake according to an alternative exemplary embodiment.

FIG. 4 shows a detailed view of an alternative embodiment of the switching device 147. Unlike the switching device illustrated in FIGS. 2 and 3, the switching valve 251 has here an additional connection 267 connected with the tank 3. In the first extreme state illustrated in FIG. 4, the switching valve 251 then also connects the pressure line 73 with the tank 3, causing the pressure accumulator 53 to be emptied or relieved. This prevents unintentional disengagement of the parking lock 227 even in the switched-off state. The piston 233 is then prevented from moving against the pressing force of the return spring 245 when the switching valve 251 is accidentally actuated. In the second extreme state, the connections 267 and 255 are both switched blind. The second switching valve 269 can then alternatively or in addition also be constructed with an additional connection to the tank 3.

Figure 5:
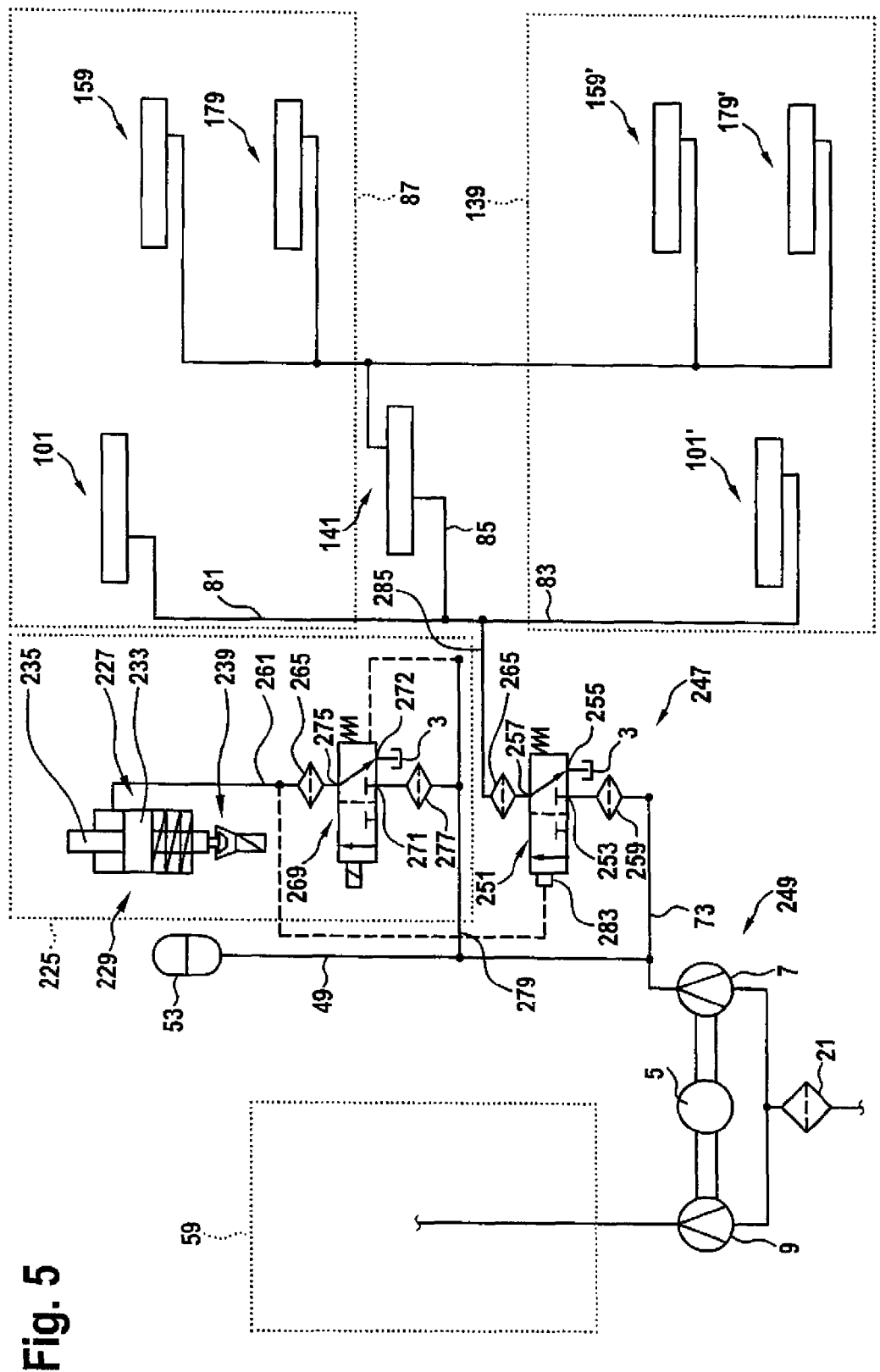
FIG. 5 shows an alternative advantageous modified embodiment of the hydraulic circuit.
Figure 6:
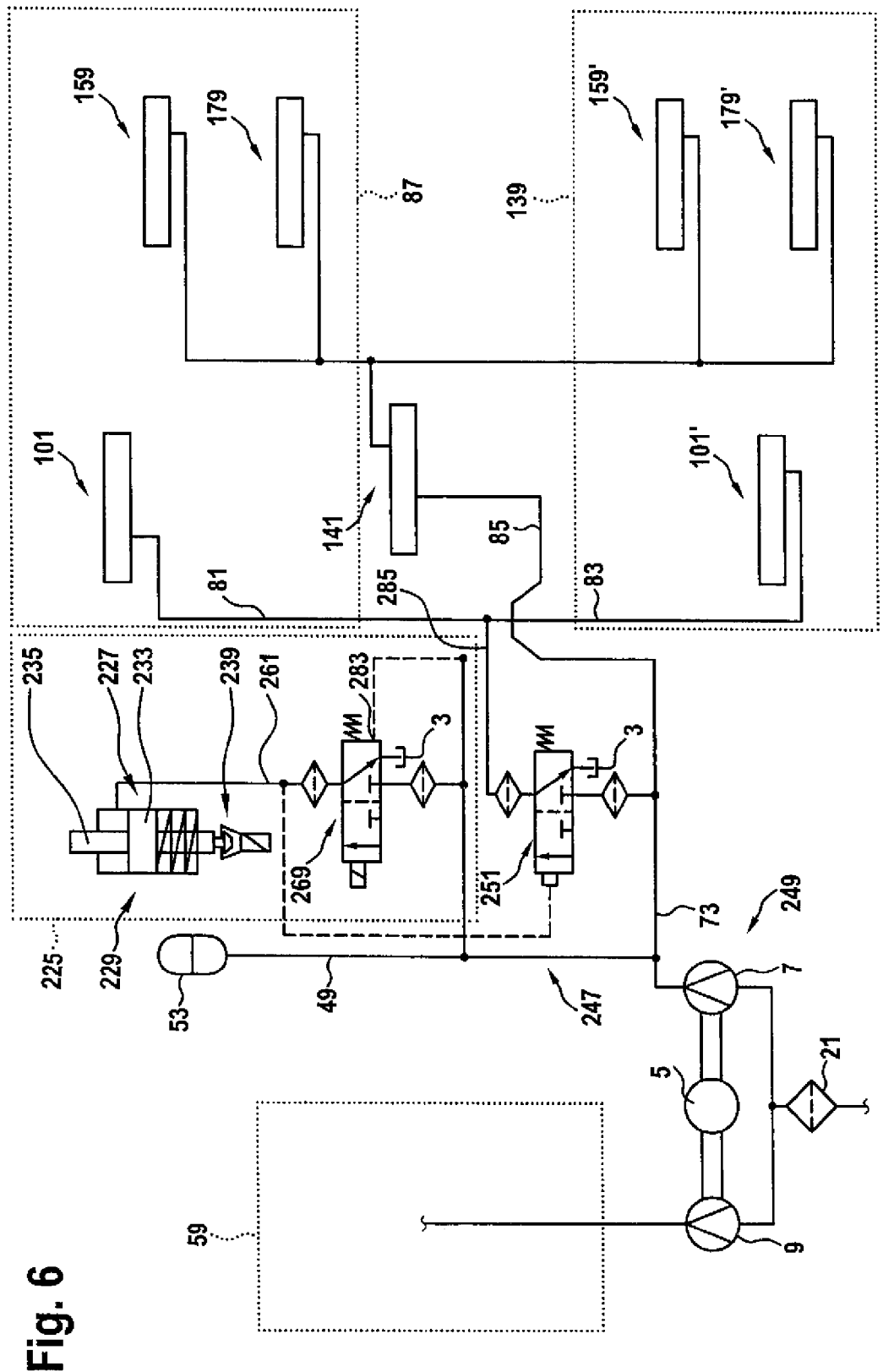
FIG. 6 shows an advantageous variant of the alternative embodiment of the hydraulic circuit.

FIGS. 5 and 6 show an alternative exemplary embodiment, wherein the switching device 247 has a second switching valve 269 in addition to the first switching valve 251. The second switching valve 269 is preferably also constructed as a 3/2-way switching valve and has connections 271, 273 and 275, wherein the connection 271 is connected via a pressure filter 277 with a line 279; the connection 272 is connected with the tank 3; and the connection 275 is connected with the line 261. The line 279 branches off the line 49 and is therefore connected in parallel with the line 73. The switching valve 269 can preferably be actuated electrically, but may also be configured for pneumatic or hydraulic actuation. Its design corresponds substantially to the design of the switching valve 251 of the preceding exemplary embodiments.

A line 281 running to a valve face 283 of the first switching valve 251 branches off from the line 261 downstream of the pressure filter 265. When pressure is applied to the valve face 283, the switching valve 251 moves to its second extreme state wherein the connection 253 is connected with a connection 257. The connection 253 is here connected by a line 285 with the line 83, from which the lines 81 and 85 branch off, as before from the line 263. The second switching valve 269 thus operates as a pilot valve for the first switching valve 251. In its first illustrated extreme position, the second switching valve 269 connects the connections 275 and 272 with each other, so that the actuator 229 is hydraulically switched unpressurized. In its second extreme position, the switching valve 269 connects the connections 271 and 275 with each other, so that pressurized hydraulic medium from the pressure source 249 is supplied to the actuator 229 and the parking lock is disengaged. At the same time, the pressure is conducted through the line 281 to the valve face 283, whereby the first switching valve 251 is actuated and moved into its second extreme position, where the connections 253 and 257 are connected with each other. The pressure control valves 101, 101', 141 are hereby connected with the pressure source 249, so that shifting and operating the clutch are possible or can be performed. When the parking lock 227 is engaged, i.e. the switching valve 269 is moved into its first extreme state, the pressure at the valve face 283 of the first switching valve 251 is eliminated, causing the switching valve 251 to return to its first extreme state due to the return force of the return spring, whereby the pressure control valves 101, 101', 141 are also switched unpressurized. This produces the aforedescribed advantages. The safety of the overall system is further enhanced by designing the second switching valve 269 as a pilot valve, thus eliminating electric actuation of the first switching valve 251. According to this exemplary embodiment, the switching device 247 includes only a single actuatable switching valve 269, so that two switching valves are actuated by actuating the switching device 247, producing the same result as before with enhanced safety. By providing the second switching valve 269, the two switching valves can be matched or optimally adapted for their respective application.

FIG. 6 shows an alternative embodiment of the modified embodiment illustrated in FIG. 5, wherein the pressure control valve 141 is once more directly connected with the line 73 via the line 85, so that only one secondary hydraulic circuit and/or partial functions of the dual-clutch transmission are deactivated or activated when the parking lock is actuated. In this case, wherein the parking brake is engaged, the clutches of the dual-clutch transmission are switched unpressurized, independent of the switching position of the pressure control valve 141. It would also be feasible to connect several second pressure control valves upstream of the gear selectors and downstream of the switching device 247, whereby at least one of the two pressure control valves, preferably all second pressure control valves, are switched unpressurized when the parking brake is engaged.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A clutch transmission with at least one automatic transmission, comprising:
   a hydraulically actuatable clutch,
   at least one hydraulically actuatable gear actuator,
   a hydraulic circuit comprising a tank providing an unpressurized hydraulic medium and a pressure source providing a pressurized hydraulic medium,
   a first pressure control valve arranged upstream of the hydraulically actuatable clutch for operating the clutch and at least one second pressure control valve arranged upstream of the at least one hydraulically actuatable gear actuator,
   a hydraulically actuatable parking lock,
   wherein at least one of the first pressure control valve and the at least one second pressure control valve is connected with an upstream switching device that connects the first pressure control valve and the at least one second pressure control valve and the hydraulically actuatable parking lock either with the pressure source or with the tank.

2. The dutch transmission of claim 1, wherein the first pressure control valve or the at least one second pressure control valve, or both, are connected with the upstream switching device.

3. The clutch transmission of claim 1, wherein the switching device comprises at least one first switching valve which is connected at a first connection with the first pressure control valve, at a second connection with the pressure source and at a third connection with the tank.

4. The clutch transmission of claim 3, wherein the first connection of the at least one first switching valve is additionally connected with the parking lock.

5. The clutch transmission of claim 4, wherein the at least one first switching valve connected with the parking lock comprises at least one valve face which is connected with the pressure source for pressure control or pressure return.

6. The clutch transmission of claim 3, wherein the switching device comprises a second switching valve which is connected with the pressure source, the tank and the parking lock, wherein the second switching valve cooperates with the at least one first switching valve and acts as a pilot valve for the at least one first switching valve.

7. The clutch transmission of claim 6, wherein of the at least one first switching valve and the second switching valve, at least the switching valve connected with the parking lock connects the pressure source with the tank, when the parking lock is also connected with the tank.

8. The clutch transmission of claim 7, wherein the pressure source comprises at least one hydraulic pressure accumulator and wherein at least the switching valve connected with the parking lock connects the pressure accumulator with the tank.

9. The clutch transmission of claim 1, wherein of the at least one first switching valve and the second switching valve, at least the switching valve connected with the parking lock comprises a return spring which urges the switching valve into a first extreme position, in which the parking lock is connected with the tank to depressurize the parking lock.

10. The clutch transmission of claim 1, wherein the at least one second pressure control valve is directly connected with the pressure source.

11. The clutch transmission of claim 1, wherein the pressure source comprises at least one pump configured to be driven by an electric motor or at least one hydraulic pressure accumulator, or both.

12. The clutch transmission of claim 1, wherein the clutch transmission is constructed as a dual-clutch transmission for a vehicle.

13. The clutch transmission of claim 12, wherein the vehicle is a motor vehicle.

* * * * *

UNITED STATES PATENT AND TRADEMARK OFFICE
CERTIFICATE OF CORRECTION

| | |
|---|---|
| PATENT NO. | : 8,915,344 B2 |
| APPLICATION NO. | : 13/464154 |
| DATED | : December 23, 2014 |
| INVENTOR(S) | : Dietmar Schuller and Martin Bauer |

Page 1 of 1

It is certified that error appears in the above-identified patent and that said Letters Patent is hereby corrected as shown below:

In the Claims

Column 14, line 39, change "dutch" to --clutch--.

Signed and Sealed this
Ninth Day of June, 2015

Michelle K. Lee
*Director of the United States Patent and Trademark Office*